US010439967B2

(12) United States Patent
Mishra

(10) Patent No.: US 10,439,967 B2
(45) Date of Patent: Oct. 8, 2019

(54) ATTACHMENT REPLY HANDLING IN NETWORKED MESSAGING SYSTEMS

(71) Applicant: Microsoft Technology Licensing, LLC, Redmond, WA (US)

(72) Inventor: Balaji Mishra, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 178 days.

(21) Appl. No.: 15/005,756

(22) Filed: Jan. 25, 2016

(65) Prior Publication Data

US 2017/0214641 A1 Jul. 27, 2017

(51) Int. Cl.
*H04L 12/58* (2006.01)
*H04L 29/08* (2006.01)
(Continued)

(52) U.S. Cl.
CPC ............ *H04L 51/08* (2013.01); *G06F 16/907* (2019.01); *G06F 17/24* (2013.01); *H04L 51/16* (2013.01); *H04L 67/06* (2013.01); *G06Q 10/107* (2013.01)

(58) Field of Classification Search
CPC .. G06Q 10/107; G06Q 10/10; G06Q 30/0601; G06Q 10/109; H04L 51/08; H04L 51/16; H04L 67/02; H04L 67/10; H04L 67/42; H04L 67/2876; H04L 69/14; H04L 2463/102; H04L 51/046; H04L 63/045; H04L 63/0823; H04L 63/0853; H04L 67/16; H04L 67/26; H04L 67/28; H04L 67/325; H04L 69/329; H04L 29/06; H04L 51/02; H04L 63/0272; H04L 63/0281; H04L 63/061; H04L 67/32; H04L 67/34;
(Continued)

(56) References Cited

U.S. PATENT DOCUMENTS 5,781,901 A 7/1998 Kuzma
7,003,551 B2 2/2006 Malik
(Continued)

FOREIGN PATENT DOCUMENTS

WO 2003005220 A1 1/2003

OTHER PUBLICATIONS

"International Search Report and Written Opinion Issued in PCT Application No. PCT/US2017/013592", dated Mar. 30, 2017, 11 Pages.
(Continued)

*Primary Examiner* — Chris Parry
*Assistant Examiner* — Abderrahmen Chouat

(57) ABSTRACT

Systems, methods, apparatuses, and software for network messaging systems in computing environments are provided herein. In one example, a networked messaging system is provided that presents a message to a user, the message being associated with a conversation thread comprising one or more members and having a file attachment. The networked messaging system receives a reply instruction issued by the user to reply to the conversation thread with a modified version of the file attachment, and responsively establishes a reply message associated with the conversation thread that includes the modified version of the file attachment. The networked messaging system transfers the reply message with the modified version of the file attachment for delivery to the one or more members.

20 Claims, 5 Drawing Sheets

(51) Int. Cl.
*G06F 17/24* (2006.01)
*G06F 16/907* (2019.01)
*G06Q 10/10* (2012.01)

(58) Field of Classification Search
CPC ....... H04L 69/24; H04L 12/185; H04L 51/04;
H04L 63/0428; H04L 63/18; H04L
67/2852; H04L 67/306; H04L 67/322;
H04L 12/1827; H04L 67/06; H04L
12/1822; H04L 51/14; H04L 51/22; H04L
51/32; H04L 67/14; H04L 67/141; H04L
67/2814; H04L 67/2819; H04L 67/2823;
H04L 67/2842; H04L 51/00; G06F
3/0484; G06F 3/0482; G06F 3/04842;
G06F 16/10; G06F 16/16; G06F 16/168;
G06F 16/178; G06F 16/2379; G06F
16/735; G06F 16/907; G06F 16/951;
G06F 3/04847; G06F 16/22; G06F 16/24;
G06F 17/24; G06F 2213/0038; G06F
3/0481; G06F 3/04817; Y10S 707/99945;
Y10S 707/99931; Y10S 707/99943; Y10S
707/99953; H04W 12/00; H04W
12/00503; H04W 12/00504; H04W 12/04;
H04W 12/06; Y02D 50/30; G06T 13/80;
G06T 2200/24
See application file for complete search history.

(56) References Cited

U.S. PATENT DOCUMENTS

| | | | |
|---|---|---|---|
| 7,054,905 B1 | 5/2006 | Hanna et al. | |
| 7,403,955 B2 | 7/2008 | Demsky et al. | |
| 2001/0054073 A1 | 12/2001 | Ruppert et al. | |
| 2003/0115273 A1 | 6/2003 | Delia et al. | |
| 2004/0064733 A1 | 4/2004 | Gong | |
| 2005/0050460 A1 | 3/2005 | Bedingfield, Sr. | |
| 2005/0076082 A1 | 4/2005 | Le Pennec et al. | |
| 2006/0031345 A1* | 2/2006 | Chang | G06Q 10/10 709/206 |
| 2007/0078902 A1 | 4/2007 | Buschi et al. | |
| 2008/0201364 A1 | 8/2008 | Buschi et al. | |
| 2009/0319618 A1* | 12/2009 | Affronti | G06Q 10/107 709/206 |
| 2014/0074948 A1 | 3/2014 | Farkas | |
| 2014/0172997 A1 | 6/2014 | Chan et al. | |
| 2014/0195928 A1* | 7/2014 | Carlen | G06F 3/0484 715/752 |
| 2014/0280403 A1* | 9/2014 | Swansegar | G06F 16/9577 707/827 |
| 2015/0199440 A1* | 7/2015 | Roeder | H04L 51/16 707/692 |
| 2015/0281149 A1 | 10/2015 | Masterson et al. | |

OTHER PUBLICATIONS

Poremsky, Diane, "Edit and Save Outlook's Read-Only Attachments", Retreived on: Nov. 6, 2015, Available at: http://www.slipstick.com/outlook/edit-and-save-outlook-attachments/.

"Second Written Opinion Issued in PCT Application No. PCT/US2017/013592", dated Dec. 18, 2017, 5 Pages.

* cited by examiner

ATTACHMENT REPLY HANDLING IN NETWORKED MESSAGING SYSTEMS

TECHNICAL BACKGROUND

Networked messaging platforms have become popular for transferring communications between users, such as electronic mail (email), instant messaging, text messaging, or other messaging technologies. These messaging platforms can be provided for end users to draft or compose various messages and create conversation-threaded communications for interaction with one or more users. Messaging systems have become increasing employed on smartphones, computers, laptops, tablets, gaming systems, and the like. User interfaces are typically employed by these messaging systems for users to compose or respond to messages. The user interfaces can include stand-alone email applications which can include local, web, or cloud-based user interfaces. Smartphone devices and tablet computing devices can include one or more user apps that allow a user to interact with messaging systems and compose messages. In many examples, files or other data can be attached to these messages, such as when sending a document or picture to one or more users. However, file attachments can be cumbersome to manage when users interact with email or messaging systems, especially when a user desires to edit or alter a file attachment.

Overview

Systems, methods, apparatuses, and software for network messaging systems in computing environments are provided herein. In one example, a networked messaging system is provided that presents a message to a user, the message being associated with a conversation thread comprising one or more members and having a file attachment. The networked messaging system receives a reply instruction issued by the user to reply to the conversation thread with a modified version of the file attachment, and responsively establishes a reply message associated with the conversation thread that includes the modified version of the file attachment. The networked messaging system transfers the reply message with the modified version of the file attachment for delivery to the one or more members.

In another example, an electronic mail service is provided. The electronic mail service presents an electronic mail message to a user, the electronic mail message having a file attachment and being associated with a conversation thread comprising one or more members. The electronic mail service receives a reply instruction issued by the user to reply to the conversation thread with a modified version of the file attachment, and responsively establishes a reply message associated with the conversation thread that includes the modified version of the file attachment. The electronic mail service transfers the reply message with the modified version of the file attachment for delivery to the one or more members.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Networked messaging platforms, such as electronic mail (email) systems, instant messaging platforms, text messaging, or other messaging technologies, allow one or more users to compose various messages and create conversation-threaded communications for interaction with one or more users. These threaded communications can be related by one or more associated message properties, such as by identifiers, shared subject line content in an email thread, or a common set of users. In many examples, files or other data can be attached to these messages to share documents, pictures, or other files with one or more users. However, file attachments can be cumbersome to manage when users interact with email or messaging systems, especially when a user desires to edit or alter a file attachment. Typically, a user wishing to edit a file attached to a message or email must first save any associated file to a separate location, then summon an editor or viewer application to modify the saved file. This sequential process can prevent the user from responding to an associated conversation without performing a series of steps to view a message, save an attached file, modify the file, create a reply message, and attach a modified file. This process can be especially difficult when a user has to interface with a smartphone or tablet device which might not have local storage readily accessible.

Figure 1:
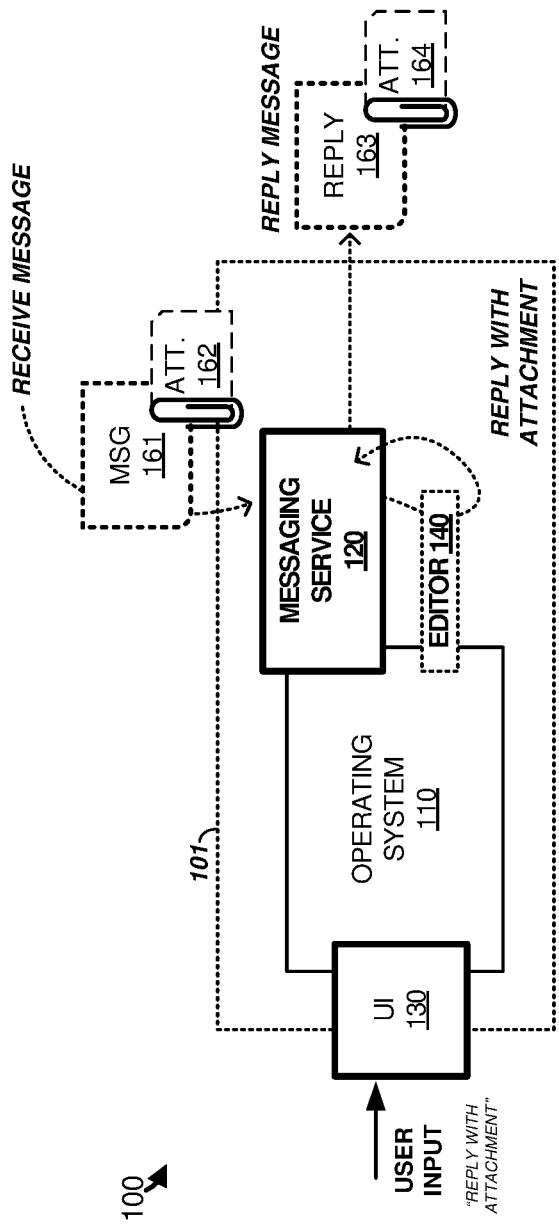
FIG. 1 illustrates a computing environment in an implementation.

In a first example of enhanced handling of file attachments to networked messaging systems, FIG. 1 is presented. FIG. 1 illustrates implementation 100 suitable for implementing any of the architectures, processes, and operational scenarios disclosed herein. Specifically, implementation 100 includes messaging platform 101 comprising operating system (OS) 110, messaging service 120, user interface (UI) 130, and optionally, editor 140. Each of the elements of implementation 100 can be logically or communicatively coupled and executed on an associated computing system or processing system which can include elements as discussed below for FIGS. 3 and 5, although variations are possible.

In operation, message 161 is received into messaging service 120. Message 161 includes one or more attachments, such as attachment 162 in FIG. 1. Messaging service 120 can present an indication of message 161 to a user, such as over user interface 130. A user can select to view message 161 and modify attachment 162, such as in editor 140. Editor 140 can alter the contents of attachment 162. The user can then select to reply to message 161 with a modified version of attachment 162, and a reply message can be generated as a reply to message 161 which includes the modified version of attachment 162.

Figure 2:
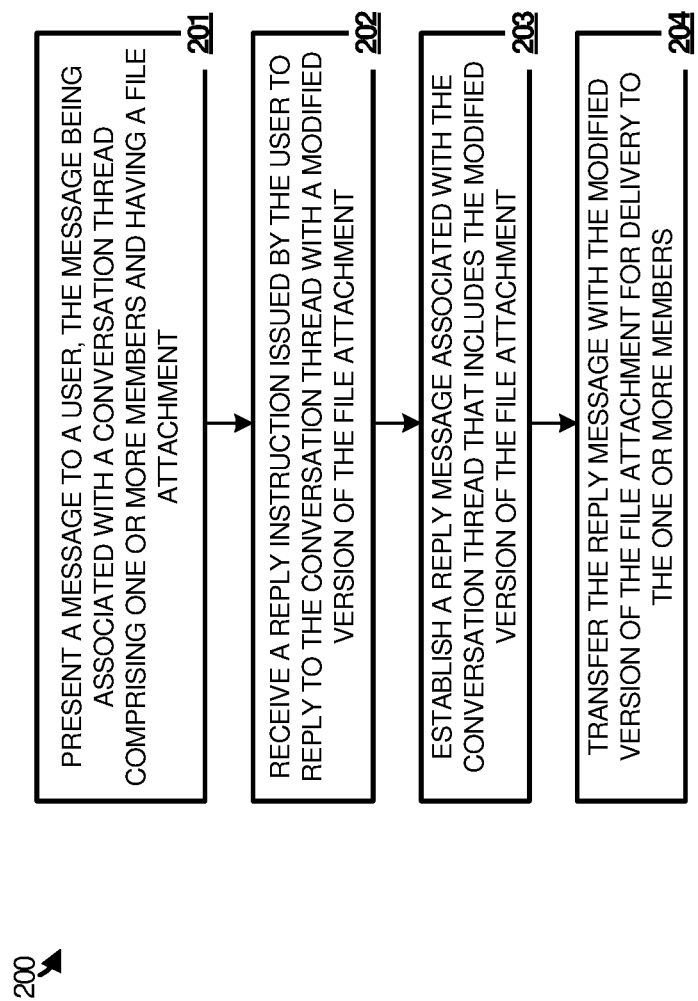
FIG. 2 illustrates a message attachment process in an implementation.

FIG. 2 further details example operation of the elements of implementation 100. In FIG. 2, messaging service 120 presents (201) an electronic mail message to a user, the electronic mail message being associated with a conversation thread comprising one or more members and having a file attachment. In FIG. 1, message 161 is received into messaging service 120. Message 161 can be received over a network interface, such as one or more packet links, or can be initially received by a network interface associated with implementation 100 which then transfers message 161 to messaging service 120 over one or more logical interfaces.

Message 161 includes attachment 162, which in this example is a file comprising content. Attachment 162 can be a document, spreadsheet, image, media file, or any type of file, which can include compressed, encoded, or encrypted file types. When message 161 comprises an electronic mail (email) message, then attachment 162 can comprise any file type which is attached to an email and transferred by a user. Message 161 can be associated with threaded communications, such as conversation threads that span one or more messages received over time. In email examples, a threaded conversation can comprise an ongoing chain of communications which are linked by a common message history. This common message history can be correlated by a common subject line in email communications, which can include prefixes such as "RE:" (indicating responses) or "FWD:" (indicating forwarded communications), among others, so that a main portion of the subject line indicates the conversation thread. In other examples, the conversation thread can be indicated by a file attachment that is shared among messages, such as when a group of user is collaborating to edit or view a document and using email or other messaging platforms as an exchange medium.

Once message 161 is received and presented to a user, such as over UI 130, then the user can view and edit the message or file attachment. A user might desire to modify the file attachment and send the file attachment to users of a communication thread associated with the message. In some examples, the user can select a user interface element, like a button, hyperlink, or menu selection, to initiate a reply message which corresponds to the original conversation thread associated with the message. This reply message typically will include a similar subject line as the original message and can include one or more recipients that correspond to members of the conversation thread (such as in "reply all" user selections). However, an attachment is typically not included with the reply message until the user indicates to attach a file to the reply message and finds an appropriate file to attach, using further dialog boxes or command-line input methods. Alternatively, a user can select to forward the message which might include the original, unmodified, file attachment along with a common subject line for the conversation thread. However, in forwarding examples, a user must still add recipients, which can be cumbersome to find and ensure parity with ones of the conversation thread. Advantageously, the examples herein discuss "reply with attachment" processes that can attach modified versions of file attachments, and also include recipients from originating conversation threads, along with other properties (which can include subject lines or thread identifiers).

Messaging service 120 receives (202) a reply instruction issued by the user to reply to the conversation thread with a modified version of the file attachment. This reply instruction can comprise a "reply with attachment" instruction that can be indicated by a user through a user interface element selection. A user interface element can include a graphical user interface element, such as a button, hyperlink, menu item, or other user interface element. The user interface element can include a command line interface with a textual command issued to indicate the reply and file to be included as an attachment.

The modified version of the file attachment comprises a changed version of the file attachment originally included with a message, such as a modified version of attachment 162 originally received with message 161. The file attachment can be edited in an appropriate editor application, such as editor 140, which can include an editor to modify text, formatting, image content, multimedia content, metadata, or other content included in the file attachment or associated with the file attachment. In some examples, editor 140 comprises a separate application than messaging service 120, and messaging service 120 opens the file attachment within editor 140 from within messaging service 120 responsive to user commands. In other examples, editor 140 and messaging service 140 comprise a shared or similar application, such as when messaging service 120 includes editor 140 or messaging service 120 and editor 140 are included in a common software application. Once the file attachment is edited in the associated editing application, then the user can select to reply to the original conversation thread associated with the file attachment with the modified version of the file attachment.

Messaging service 120 establishes (203) a reply message associated with the conversation thread that includes the modified version of the file attachment. In FIG. 1, reply message 163 is shown with file attachment 164. File attachment 164 comprises the modified version of attachment 162 in this example. Reply message 163 comprises a response to the conversation thread associated with message 161. Thus, the reply message is established to be a further message in a conversation thread that is associated with message 161, and typically will comprise a response to message 161. However, the reply message also includes the modified version of the file attachment, such as modified by editor 140. In many examples, the reply message also includes recipients which correspond to the conversation thread, which may comprise recipients found in message 161. A dialog box or user interface configuration comprising the reply message can be presented to the user using UI 130 which includes the modified version of the file attachment along with any associated recipients. A user can then indicate to transfer the reply message, and can include further message contents or recipients beyond what is initially presented to the user.

To establish the reply message as a response to the conversation thread, messaging service 120 determines that the modified version of the file attachment corresponds to an unmodified file attachment 162 originally received with message 161. A conversation thread associated with the unmodified file attachment can be identified using the identify of the file attachment which can include a file name, file identifier, or other identify or metadata associated with the file attachment. A message from the conversation thread associated with the file attachment (such as a most recent message of the conversation thread or a message from which the file attachment originated) can be identified and a reply message established which replies to the conversation thread. The modified version of the file attachment is also attached to the reply message automatically by messaging service 120.

Messaging service 120 might search a message history, mailbox, or local message cache to identify a conversation thread or original message from which to establish a reply message. For example, a local mail cache or local mail store can be searched using a filename of the modified version of the file attachment to find a message that has a file attachment with the same filename A "reply all" dialog box can then be opened as a response to a message that included the file attachment of that filename, and the modified version of the file attachment can be attached thereto. Further processes to establish the reply message can be performed, such as discussed below for FIGS. 3-5.

Messaging service 120 transfers (204) reply message 163 with the modified version of the file attachment (164) for delivery to the one or more members of the conversation thread. This reply message can be transferred over one or more network interfaces which relay the reply message over any number of packet networks or packet links. In further examples, messaging service 120 relays this reply message over a logical link for delivery to users indicated as recipients in the reply message.

Advantageously, a user can indicate to reply to a conversation thread with a modified version of a file attachment using a single user interface action, namely a "reply with attachment" command. This can provide for more efficient responses to conversation threads than a sequence of separate user actions. Fewer user interaction steps are required in the examples herein, leading to more efficient operation of a computing system or computing systems which provide messaging service 120. For example, file attachment editing processes in email applications can be executed in fewer processing operations and thus reducing workload and power consumption in processing devices of implementation 101. Moreover, a smaller memory footprint can be employed to allow for more efficient use of operating system 110 and messaging service 120. In some examples, a cloud-based or virtualized version of messaging service 120 is employed, and the processes discussed herein can reduce a quantity or need for local storage devices that a user employs when editing a file attachment, which can also reduce network traffic volumes and communication overhead.

Returning to the elements of FIG. 1, operating system 110 comprises one or more execution elements which provide an execution platform between user-facing applications and input devices and associated execution hardware. In many examples, operating system 110 comprises a multitasking or multithreaded operating environment for user applications, such as messaging service 120 and editor 140, among other applications or services, and also provides logical access to user interface 130 and various hardware elements, such as displays, user input devices, multimedia devices, and the like. Operating system 110 allows execution of messaging service 120 and editor 140 on associated processing systems and memory devices.

User interface (UI) 130 comprises one or more graphical or textual user interface elements which are presented to a user of implementation 100 for interacting with the elements of messaging service 120, among other applications and services. UI 130 can comprise many graphical layers or graphical elements which are superimposed and correlated to render an interactive windowed or tablet interface to a user, such as over one or more display screens. UI 130 can also include various audio output elements for indicating audible user interface elements to a user. UI 130 receives user input from various input devices, such as a keyboard, mouse, touch screen, touch panel, gaming controller, or other user input devices which can be used in combination with such as mouse input, keyboard input, voice input, visual input, or other user input methods. This user input can be detected by UI 130 and translated into actions which can be interpreted by further elements of implementation 100, such as operating system 110 or messaging service 120.

Messaging service 120 and editor 140 each comprise user applications, such as a messaging application, content editing application, productivity application, gaming application, or communication application, which is executed using OS 110 on a processing system. Messaging service 120 and editor 140 each present one or more user interface elements, such as those rendered using UI 130, to allow a user to interact with messaging service 120 and editor 140. For example, in messaging service 120, messages can be received over one or more network interface, displayed to a user via US 130, and a user can view email, edit and compose emails, and edit any file attachments. Editor 140 provides for editing and viewing of file attachments, such as text documents, spreadsheets, images, media files, or other file attachment. For example, when a file attachment comprises a spreadsheet, editor 140 allows for viewing and editing of an organized array of cells which are presented to a user in a graphical arrangement, along with any associated menus, tabs, status indicators, and user input elements.

Figure 3:
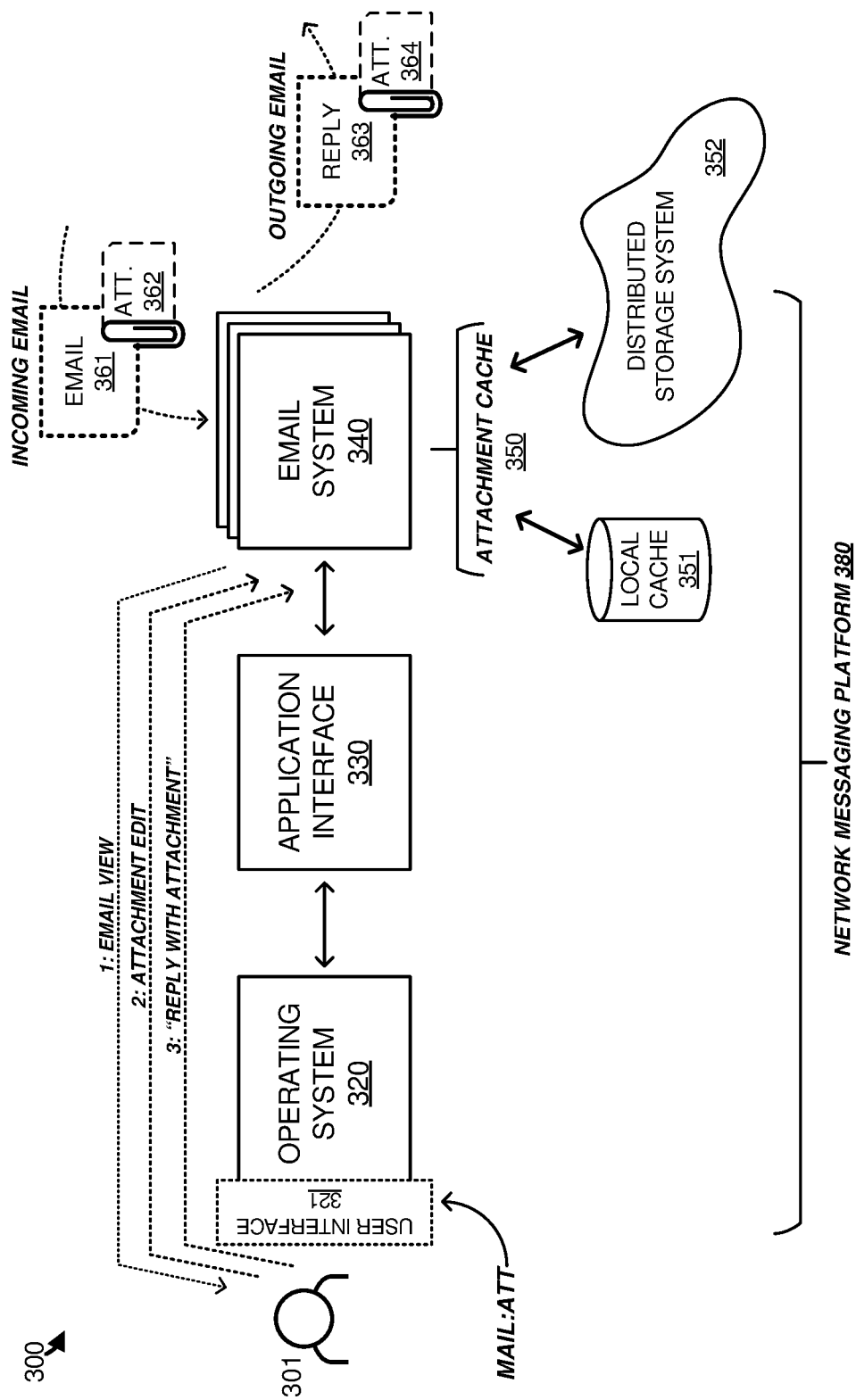
FIG. 3 illustrates a computing environment in an implementation.

As a further example of a platform which provides enhanced messaging services, FIG. 3 is presented. FIG. 3 is a system diagram illustrating implementation 300. Implementation 300 includes operating system 320, application interface 330, and email system 340, and attachment cache 350. Operating system 320 also includes user interface 321. Attachment cache 350 can include ones of local cache 351 and distributed storage system 352. The elements of implementation 300 can be communicatively coupled by one or more packet links, network interfaces, logical interfaces, communication interfaces, among others, such as those described herein for FIG. 1 and FIG. 5.

The elements of implementation 300 can be included in network messaging platform 380. When network messaging platform 380 is included in one or more computing devices, these devices can include a processing system, display panel with associated touch screen user interface, data storage systems, communication interfaces, and other associated computing and storage elements. The one or more computing devices operate as discussed herein. In some examples, network messaging platform 380 comprises a software environment, while in other examples, a portion of the software environment is included in one or more distributed computing systems and only user interface elements reside in a computing device associated with user 301. In some examples, network messaging platform 380 is representative of one or more end user computing devices, such as a smartphone, tablet computer, computer, laptop, server, gaming device, media capture device, personal digital assistant (PDA), e-book, mobile Internet appliance, media player, or other devices, including combinations thereof. Network messaging platform 380 can communicate over one or more data links, which can include network interfaces, wireless interfaces, transceivers, network interface cards, or other links. Network messaging platform 380 comprises network transceiver circuitry, processing circuitry, and user interface elements. The transceiver circuitry typically includes amplifiers, filters, modulators, and signal processing circuitry. Network messaging platform 380 can also include user interface systems, network interface card equipment, memory devices, non-transitory computer-readable storage mediums, software, processing circuitry, or some other communication components.

In a first example, operating system 320 and application interface 330 are included in a user device, such as a smartphone, laptop computer, tablet computer, desktop computer, gaming device, or other user devices. In this first example, email system 340 and attachment cache 350 can be included in a remote system, such as a server, distributed computing system, cloud system, web application system, or other systems. When web-based or cloud-based email systems are employed, then application interface 330 can comprise a web interface or application programming interface (API) which a user can access email system 340 through a browser application or smartphone/tablet app. Application interface 330 can be omitted in some examples. In a second example, operating system 320, application interface 330, email system 340, and attachment cache 350 can be included in a computing device, such as a smartphone, laptop computer, tablet computer, desktop computer, gaming device, or other user devices. Other configurations are possible and portions of each of the elements of FIG. 3 can be included in various devices and systems.

In operation, email system 340 receives email messages over one or more network interfaces or packet links, such as Internet Protocol (IP) links, transmission control protocol (TCP), or an email messaging protocol link comprising Post Office Protocol (POP), Internet Message Access Protocol (IMAP), Messaging Application Programming Interface (MAPI), or Microsoft Exchange protocols, including combinations and variations thereof. In FIG. 3, electronic mail message (email) 361 is shown being received by email system 340, and email 361 includes attachment 362. Attachment 362 can be a data file or other message attachment which comprises a document, image, encoded data, compressed file, executable code, scripting, or other message attachments, including combinations thereof. Attachment 362 is transferred with email 361 in this example, and can be a Multipurpose Internet Mail Extensions (MIME) compliant attachment or uuencoded attachment, among others.

Figure 4:
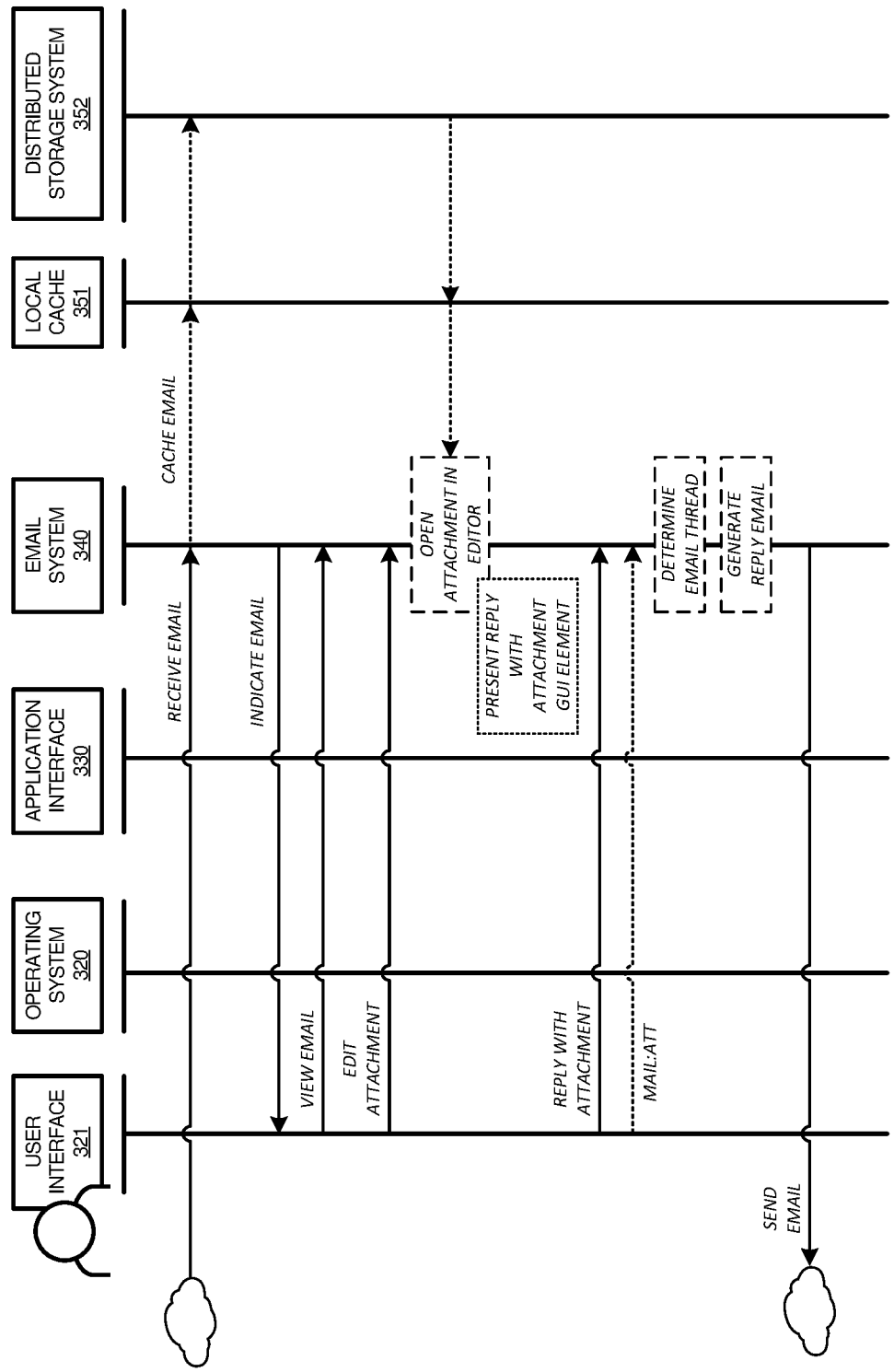
FIG. 4 illustrates a message attachment process in an implementation.

Turning now to a further example operation of the elements of FIG. 3, FIG. 4 is presented. FIG. 4 is a sequence diagram illustrating an example operation of the implementation 300. The operations of FIG. 4 can instead be employed on any of the hardware/software elements discussed herein, such as implementation 100 in FIG. 1 or computing system 501 in FIG. 5.

In FIG. 4, email system 340 receives one or more emails over an associated interface, such as over any of the network links or messaging protocol interfaces mentioned herein. The message is illustrated in FIG. 3 as email 361 and includes attachment 362. In this example, attachment 362 is a document comprising content, although other attachment types can be employed. Once received, email system 340 can cache or store email 361 and attachment 362 in any number of storage areas, such as attachment cache 350. Attachment cache 350 can comprise any of local cache 351 or distributed storage system 352. Local cache 351 can comprise a storage device local to email system 340, such as a memory device, hard drive, or solid state storage device associated with a computing system of email system 340. Distributed storage system 352 can comprise any number of storage devices which might be distributed over a geographic area and located remotely from email system 340. Microsoft SharePoint®, Microsoft OneDrive®, or cloud storage systems are examples of distributed storage system 352. In some examples, such as when email system 340 comprises a Microsoft Exchange-based system, email 361 and attachment 362 can be stored on a server or cloud storage system as well as stored on local computing device of user 301.

Email system 340 can indicate email 361 to user 301 over a graphical user interface or other user interface which can be provided by operating system 320 and user interface 321. User interface 321 can be a graphical user interface of an email application executed by user 301 on a computing device of user 301. User interface 321 can be a web-based interface or portal interface through which user 301 can view email in a browser application executed by user 301 on a computing device of user 301. User interface 321 can include smartphone or tablet apps which include one or more graphical user interfaces or web interfaces. User interface 321 can include a text-based or terminal interface.

User 301 can select to view email 361 and attachment 362, as well as edit content of attachment 362. The content of attachment 362 can be edited in a content editor or attachment editor environment, such as a word processor, spreadsheet application, media editor, or other editor application. In some examples, the editor application is incorporated in email system 340, while in other examples, email system 340 instantiates an editor application with attachment 362 as a file to be opened and edited.

When an editor application or when email system 340 is used by user 301 to open attachment 362 for editing, user 301 might desire to respond to an existing email thread with the modified version of attachment 362. In some examples, user 301 might have to save attachment 362 to local storage devices, then find the modified version when creating a new email or a reply email in a user interface of email system 340. However, in the examples herein, an additional process is employed which allows for more efficient handling of modified attachments. Specifically, email system 340 presents a "reply with attachment" option to user 301 in user interface 321, such as a specialized button or other user interface element.

Responsive to user 301 selecting "reply with attachment," email system 340 will determine a conversation thread that is associated with the attachment open in the editor application and generate a reply email which has the modified version of the attachment as an attachment, as well as any associated members of the conversation thread applied as "TO:" recipients (or "CC:"/"BCC:" recipients if the thread has those members listed as such). An associated subject property of the email conversation thread can be included in the reply email along with any associated "RE:" designation if so configured. If user 301 instead replied to an email of the conversation thread without using the "reply with attachment" option, then a reply email can be generated, but the modified version of the file attachment would not be attached, and the user would be required to find the attachment in an associated storage device or storage location. Advantageously, the "reply with attachment" option allows a user to reply to an existing conversation thread from which the file attachment originated, and the modified version of the file attachment will be included automatically by email system 340 as an attachment. Moreover, the user need not save the modified version of the file attachment to an associated local storage device or cloud storage device before commanding email system 340 or an associated editor to "reply with attachment" with the modified version of the file attachment. Instead, the modified version of the file attachment can be attached to a reply email as described above without a save process which can take additional time and additional storage resources.

To determine the conversation thread associated with the file attachment open in the editor environment, email system 340 can perform a search of email information or a plurality of emails that are stored by email system 340. For example, email system 340 might cache a plurality of emails and attachments in an associated email storage system, such as attachment cache 350. Email system 340 can search this email storage system to correlate the currently open or edited attachment to a file attachment stored in the email storage system. This file attachment can be searched for using a file identifier or other property of the file attachment. For example, the file identifier can comprise a file name, attachment identifier, or other identifier. Email system 340 can identify an email which is associated with the file attachment, such as by searching the email storage system for an email which is correlated to the file attachment. Once the email is identified, then email system 340 can establish a reply email which replies to the email using properties of the email to establish the reply. For example, the conversation thread might have many emails associated therewith. A particular email from the conversation thread can be selected as the basis for the reply email, such as the email which originally contained the file attachment which was modified, or a last-received email if any intervening emails were received before editing of the file attachment or during editing of the file attachment. Various properties of the conversation thread can be carried forward and applied to the reply email, such as subject lines, recipients/members of the thread, message history, previous email text, and the like. The reply email will have the modified version of the file attachment included as an attachment.

Once the reply email is generated, then user 301 can add any additional information into the email, such as additional text, content, or other information, including further file attachments. User 301 can alter the reply email, such as by adding or removing recipients, or altering a subject line or other properties. User 301 can then select via user interface 321 to send or otherwise transfer the reply email for delivery to the recipients indicated in the reply email.

In alternative examples, a command line or text-based "reply with attachment" process can occur. Specifically, user 301 might have a modified version of a file attachment or a new file to attach to an email. User 301 can enter one or more text-based command line instructions into a command line interpreter to instruct email system 340 to generate a reply email with an attachment that is specified in the command line instruction. Specifically, a "mail:att" command can be established for use by user 301 in user interface 321 to instruct email system 340 to generate a reply email with an attachment specified as a parameter to the "mail:att" command. For example, user 301 can enter "mail:att filename doc" which would specify an attachment should be included in an email generated by email system 340. This new email might be a new email which includes no recipients and subject line, but has the file attachment already included as an attachment by email system 340. This new email might be a reply email to an existing conversation thread. In the examples of a reply email, email system 340 can responsively search for an associated conversation thread based on properties of the specific file attachment, such as a file name, file identifier, and the like. Once a thread which corresponds to the file attachment is found, then a reply message to that thread can be generated, such as described above. Although other parameters to the "mail:att" command can be included, such as conversation thread identifiers, recipients, subject lines, and the like, in the examples herein, only a file name need be specified and email system 340 can determine a conversation thread based on at least the file name. Also, the command example "mail:att" is merely exemplary, and other formats, commands, and syntax can be employed.

Figure 5:
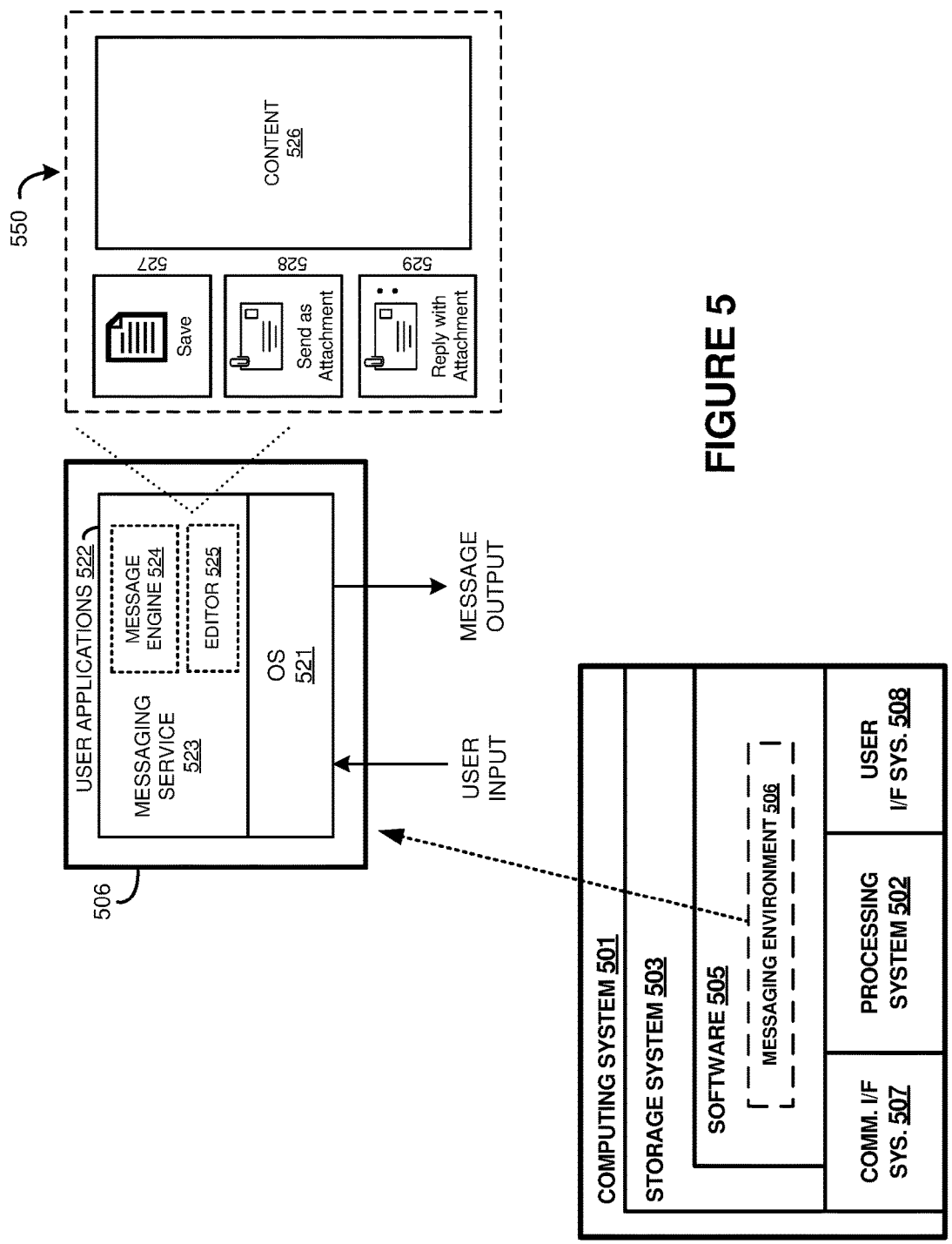
FIG. 5 illustrates a computing system suitable for implementing any of the architectures, processes, and operational scenarios disclosed herein.

In FIG. 4, FIG. 5 illustrates computing system 501 that is representative of any system or collection of systems in which the various operational architectures, scenarios, and processes disclosed herein may be implemented. Examples of computing system 501 include, but are not limited to, smart phones, laptop computers, tablet computers, desktop computers, hybrid computers, gaming machines, virtual machines, smart televisions, smart watches and other wearable devices, as well as any variation or combination thereof. Other examples include server computers, rack servers, web servers, cloud computing platforms, and data center equipment, as well as any other type of physical or virtual server machine, and any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes messaging environment 506, which is representative of the processes discussed with respect to the preceding Figures. When executed by processing system 502 to enhance message handling and attachment handling for network messaging applications, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced attachment processing and message handling for network messaging platforms.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include messaging environment 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced attachment processing and message handling for applications. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Messaging environment 506 includes one or more software elements, such as OS 521, user applications 522, and messaging service 523. These elements can describe various portions of computing system 501 with which a user interacts. For example, OS 521 can provide a software platform on which user application is executed and allows for receipt and monitoring of input from user interface system 508 and delivery of messages and other content over communication interfaces. User applications 522 can be any application discussed herein, such as productivity, messaging, electronic mail, network messaging, editors, word processors, spreadsheets, or applications, and includes user interface elements which can be manipulated by a user.

In one example, messaging service 523 includes message engine 524 and editor 525. Message engine 524 handles receipt and transfer of messages and attachments. Message engine 524 can present messages and attachments to users, such as through user interface system 508. When a user desires to alter or modify an attachment associated with a message handled by message engine 524, editor 525 can be employed. Editor 525 can have a user interface as illustrated by editor interface 550 in FIG. 5. Editor interface 550 includes several user interface elements, which can comprise command line, graphical, or web-based user interface elements, among others. In FIG. 5, "save" command 527 is shown and allows a user to save an attachment in editor 525; "send as attachment" command 28 is shown and allows a user to send an attachment currently open in editor 525 as an attachment in a new message by message engine 524; and "reply with attachment" command 629 is shown and allows a user to reply to a pre-existing conversation thread handled by message engine 524 with the attachment open in editor 525. Editor interface 550 also includes content editing portion 526 that a user can make alterations or edits to content associated with the attachment.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 508 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 508. In some cases, the input and output devices may be combined in a single device, such as a display capable of displaying images and receiving touch gestures. User interface system 508 can instead provide output and receive input over a network interface, such as communication interface system 507. In network examples, user interface system 508 might packetize display or graphics data for remote display by a display system or computing system coupled over one or more network interfaces.

User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Various improvements to message processing and attachment handling technology may be appreciated from the foregoing implementations. The ability of a network messaging application to provide user interface options for replying to conversation threads with modified attachments can provide for enhanced operation of messaging applications. The applications can become more efficient in handling of attachments and modification of attachments, which can reduce processing time and memory usage by reducing the need for a user to save attachments and search local drives manually to find such attachments for modification and transfer in existing messaging threads. These technical effects improve the functioning of network messaging applications and associated operating systems, reduce storage footprints and need for local storage devices (such as when these features are implemented in cloud-based or web-based applications), and allow users of smartphones and other touchscreen-based devices to edit attachments efficiently.

Certain inventive aspects may be appreciated from the foregoing disclosure, of which the following are various examples.

Example 1

A computing apparatus comprising one or more computer readable storage media, a processing system operatively coupled with the one or more computer readable storage media, and program instructions stored on the one or more computer readable storage media comprising an electronic mail service, wherein the electronic mail service, when executed by the processing system, directs the processing system to at least present an electronic mail message to a user, the electronic mail message having a file attachment and being associated with a conversation thread comprising one or more members, receive a reply instruction issued by the user to reply to the conversation thread with a modified version of the file attachment, and responsively establish a reply message associated with the conversation thread that includes the modified version of the file attachment, and transfer the reply message with the modified version of the file attachment for delivery to the one or more members.

Example 2

The apparatus of Example 1, comprising further program instructions, when executed by the processing system, direct the processing system to at least receive a view instruction from the user to view the file attachment, and responsively open the file attachment in a user interface from which modifications to the file attachment are performed to establish the modified version of the file attachment.

Example 3

The apparatus of Examples 1-2, comprising further program instructions, when executed by the processing system, direct the processing system to at least, responsive to the reply instruction, determine the conversation thread associated with the file attachment based at least on properties of the modified version of the file attachment, and generate the reply message as having the modified version of the file attachment attached to the reply message and indicating at least recipients comprising the one or more members.

Example 4

The apparatus of Examples 1-3, wherein the reply message is generated to further indicate at least a subject property of the conversation thread.

Example 5

The apparatus of Examples 1-4, comprising further program instructions, when executed by the processing system, direct the processing system to at least determine the conversation thread associated with the file attachment by at least searching contents of a message cache that caches at least the electronic mail message, and correlate the modified version of the file attachment with the conversation thread based at least on the contents of the message cache and one or more properties of the modified version of the file attachment.

Example 6

The apparatus of Examples 1-5, comprising further program instructions, when executed by the processing system, direct the processing system to at least correlate the modified version of the file attachment to the conversation thread by at least matching an identifier associated with the file attachment found among the contents of the message cache to an identifier associated with the modified version of the file attachment.

Example 7

The apparatus of Examples 1-6, comprising further program instructions, when executed by the processing system, direct the processing system to at least receive an edit instruction from the user to edit the file attachment, and responsively provide the file attachment to an editor interface from which modifications to the file attachment are performed to establish the modified version of the file attachment, and receive an indication of the modified version of the file attachment from the editor interface along with the reply instruction, and responsively determine the conversation thread associated with the file attachment and generate the reply message as a response to the electronic mail message indicating recipients comprising the one or more members and having attached the modified version of the file attachment.

Example 8

The apparatus of Examples 1-7, comprising further program instructions, when executed by the processing system, direct the processing system to at least receive the reply instruction responsive to a command entered in command line interface, wherein the command indicates the modified version of the file attachment, and responsive to the reply instruction, identify the conversation thread based on properties of the modified version of the file attachment.

Example 9

A method of operating a networked messaging system, the method comprising presenting a message to a user, the message being associated with a conversation thread comprising one or more members and having a file attachment, receiving a reply instruction issued by the user to reply to the conversation thread with a modified version of the file attachment, and responsively establishing a reply message associated with the conversation thread that includes the modified version of the file attachment, and transferring the reply message with the modified version of the file attachment for delivery to the one or more members.

Example 10

The method of Example 9, further comprising receiving a view instruction from the user to view the file attachment, and responsively opening the file attachment in a user interface from which modifications to the file attachment are performed to establish the modified version of the file attachment.

Example 11

The method of Examples 9-10, further comprising, responsive to the reply instruction, determining the conversation thread associated with the file attachment based at least on properties of the modified version of the file attachment, and generating the reply message as having the modified version of the file attachment attached to the reply message and indicating at least recipients comprising the one or more members.

Example 12

The method of Examples 9-11, wherein the reply message is generated to further indicate at least a subject property of the conversation thread.

Example 13

The method of Examples 9-12, further comprising determining the conversation thread associated with the file attachment by at least searching contents of a message cache that caches at least the message, and correlating the modified version of the file attachment with the conversation thread based at least on the contents of the message cache and one or more properties of the modified version of the file attachment.

Example 14

The method of Examples 9-13, further comprising correlating the modified version of the file attachment to the conversation thread by at least matching an identifier associated with the file attachment found among the contents of the message cache to an identifier associated with the modified version of the file attachment.

Example 15

The method of Examples 9-14, further comprising receiving an edit instruction from the user to edit the file attachment, and responsively providing the file attachment to an editor interface from which modifications to the file attachment are performed to establish the modified version of the file attachment, receiving an indication of the modified version of the file attachment from the editor interface along with the reply instruction, and responsively determining the conversation thread associated with the file attachment and generating the reply message as a response to the message indicating recipients comprising the one or more members and having attached the modified version of the file attachment.

Example 16

The method of Examples 9-15, further comprising receiving the reply instruction responsive to a command entered in command line interface, wherein the command indicates the modified version of the file attachment, and responsive to the reply instruction, identifying the conversation thread based on properties of the modified version of the file attachment.

Example 17

A network messaging platform, comprising a network interface element configured to receive a message associated with a conversation thread directed to a user of the network messaging platform, the message having at least a file attachment. Responsive to an attachment edit command issued by the user for the file attachment, a user interface configured to call an editor interface to edit the file attachment, wherein the editor interface is configured to receive a reply command issued by the user to reply to the conversation thread with an edited version of the file attachment. A message composition element configured to process an indication of the reply command to establish a reply message as a response to the conversation thread attaching the edited version of the file attachment, and the network interface element configured to transfer the reply message with the edited version of the file attachment for delivery to one or more members of the conversation thread.

Example 18

The network messaging platform of Example 17, comprising the message composition element configured to establish the reply message by at least correlating the edited version of the file attachment to the conversation thread.

Example 19

The network messaging platform of Examples 17-18, comprising, responsive to the indication of the reply instruction, the message composition element configured to determine the conversation thread from among a plurality of messages with associated conversation threads handled by the network messaging platform, and establish the reply message as having one or more recipients comprising the one or more members of the conversation thread and having a subject line property in accordance with the conversation thread.

Example 20

The network messaging platform of Examples 17-19, comprising the message composition element configured to determine the conversation thread from among the plurality of composition threads by at least processing a message cache maintained by the network messaging platform that comprises the plurality of messages with the associated conversation threads to identify the conversation thread as being associated with the modified version of the file attachment.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
   one or more computer readable storage media;
   a processing system operatively coupled with the one or more computer readable storage media; and
   program instructions stored on the one or more computer readable storage media comprising an electronic mail service, wherein the electronic mail service, when executed by the processing system, directs the processing system to at least:
   store a file attachment of an electronic mail message in a message cache maintained by the electronic mail service as a cloud-based storage system remote from a user device;
   present a user interface to the electronic mail service for display in a browser application executed by the user device, and in the user interface to the electronic mail service:
      present the electronic mail message, the electronic mail message having the file attachment and being associated with a conversation thread comprising one or more members;
      receive from the user an instruction to edit the file attachment in the browser application, and responsively invoke a user interface to an editor application remotely executed from the user device to edit the file attachment that receives one or more edits to the file attachment while stored in the message cache to create a modified version of the file attachment;
      receive a reply instruction issued by the user to reply to the conversation thread with the modified version of the file attachment;
      present to the user the reply message as a response to the electronic mail message in the conversation thread which includes the modified version of the file attachment; and
      receive a user instruction to send the reply message and responsively instruct the electronic mail service to transfer the reply message with the modified version of the file attachment for delivery to the one or more members;
   wherein responsive to the reply instruction, the electronic mail service searches the cloud-based storage system within at least the message cache using at least a filename of the modified version of the file attachment to determine the conversation thread of the file attachment, and direct a reply message to attach the modified version of the file attachment based at least on the conversation thread of the file attachment.

2. The computing apparatus of claim 1, comprising further program instructions, when executed by the processing system, direct the processing system to at least:
   receive a view instruction from the user to view the file attachment, and responsively open the file attachment in a user interface from which modifications to the file attachment are performed to establish the modified version of the file attachment.

3. The computing apparatus of claim 1, comprising further program instructions, when executed by the processing system, direct the processing system to at least:
   generate the reply message as having the modified version of the file attachment attached to the reply message and indicating at least recipients comprising the one or more members.

4. The computing apparatus of claim 3, wherein the reply message is generated to further indicate at least a subject property of the conversation thread.

5. The computing apparatus of claim 1, comprising further program instructions, when executed by the processing system, direct the processing system to at least:
   correlate the conversation thread of the file attachment with the modified version of the file attachment.

6. The computing apparatus of claim 5, comprising further program instructions, when executed by the processing system, direct the processing system to at least:
   correlate the modified version of the file attachment to the conversation thread by at least matching the filename associated with the file attachment found among the contents of the message cache to the filename associated with the modified version of the file attachment.

7. The computing apparatus of claim 1, comprising further program instructions, when executed by the processing system, direct the processing system to at least:
   receive an edit instruction from the user to edit the file attachment, and responsively provide the file attachment to an editor interface from which modifications to the file attachment are performed to establish the modified version of the file attachment;
   receive an indication of the modified version of the file attachment from the editor interface along with the reply instruction, and responsively determine the conversation thread associated with the file attachment and generate the reply message as the response to the electronic mail message indicating recipients comprising the one or more members and having attached the modified version of the file attachment.

8. The computing apparatus of claim 1, comprising further program instructions, when executed by the processing system, direct the processing system to at least:
receive the reply instruction responsive to a text command entered in a command line interface to the electronic mail service, wherein the command indicates the filename of the modified version of the file attachment;
responsive to the reply instruction, identify the conversation thread based on properties of the modified version of the file attachment.

9. A method of operating a networked messaging system, the method comprising:
storing a file attachment of a message in message cache maintained by the networked messaging system in a cloud-based storage system remote from the user device;
presenting a user interface to the networked messaging system in a browser application executed by a user device remotely located from the networked messaging system;
in the user interface to the networked messaging system:
presenting the message to a user, the message being associated with a conversation thread comprising one or more members and having the file attachment;
receiving from the user an instruction to edit the file attachment in the browser application, and responsively invoking a user interface to an editor application remotely executed from the user device that receives one or more edits to the file attachment while stored in the message cache to create a modified version of the file attachment;
receiving a reply instruction issued by the user to reply to the conversation thread with the modified version of the file attachment, wherein the editor application indicates a filename of the modified version of the file attachment to the networked messaging system;
presenting to the user the reply message as a response to the electronic mail message in the conversation thread which includes the modified version of the file attachment; and
receiving a user instruction to send the reply message and responsively instructing the networked messaging system to transfer the reply message with the modified version of the file attachment for delivery to the one or more members;
wherein responsive to the reply instruction, the networked messaging system searches the cloud-based storage system within at least the message cache using at least the filename of the modified version of the file attachment to determine the conversation thread of the file attachment, and directs a reply message to attach the modified version of the file attachment based at least on the conversation thread of the file attachment.

10. The method of claim 9, further comprising:
receiving a view instruction from the user to view the file attachment, and responsively opening the file attachment in a user interface from which modifications to the file attachment are performed to establish the modified version of the file attachment.

11. The method of claim 9, further comprising:
generating the reply message as having the modified version of the file attachment attached to the reply message and indicating at least recipients comprising the one or more members.

12. The method of claim 11, wherein the reply message is generated to further indicate at least a subject property of the conversation thread.

13. The method of claim 9, further comprising:
correlating the conversation thread of the file attachment with the modified version of the file attachment.

14. The method of claim 13, further comprising:
correlating the modified version of the file attachment to the conversation thread by at least matching the filename associated with the file attachment found among the contents of the message cache to the filename associated with the modified version of the file attachment.

15. The method of claim 9, further comprising:
receiving an edit instruction from the user to edit the file attachment, and responsively providing the file attachment to an editor interface from which modifications to the file attachment are performed to establish the modified version of the file attachment;
receiving an indication of the modified version of the file attachment from the editor interface along with the reply instruction, and responsively determining the conversation thread associated with the file attachment and generating the reply message as the response to the message indicating recipients comprising the one or more members and having attached the modified version of the file attachment.

16. The method of claim 9, further comprising:
receiving the reply instruction responsive to a text command entered in a command line interface to the networked messaging system, wherein the command indicates the modified version of the file attachment;
responsive to the reply instruction, identifying the conversation thread based on properties of the modified version of the file attachment.

17. A network messaging platform, comprising:
a network interface element configured to receive a message associated with a conversation thread directed to a user of the network messaging platform, and store a file attachment of the message in a message cache maintained by the network messaging platform in a cloud-based storage system;
a user interface to the network messaging platform configured to, responsive to an attachment edit command issued by the user for the file attachment, invoke an editor interface to edit the file attachment;
the editor interface configured to receive one or more edits to the file attachment while stored in the message cache to create an edited version of the file attachment, and receive a reply command issued by the user to reply to the conversation thread with the edited version of the file attachment;
a message composition element configured to process an indication of the reply command to establish a reply message as a response to the conversation thread attaching the edited version of the file attachment by at least searching the cloud-based storage system within at least the message cache using at least a filename of the edited version of the file attachment to determine the conversation thread of the file attachment, and establish a reply message to attach the modified version of the file attachment based at least on the conversation thread of the file attachment; and
the network interface element configured to transfer the reply message with the edited version of the file attachment for delivery to one or more members of the conversation thread.

18. The network messaging platform of claim 17, comprising:

the message composition element configured to establish the reply message by at least correlating the edited version of the file attachment to the conversation thread.

19. The network messaging platform of claim 17, comprising:
the message composition element configured to establish the reply message as having one or more recipients comprising the one or more members of the conversation thread and having a subject line property in accordance with the conversation thread.

20. The network messaging platform of claim 19, comprising:
the message composition element configured to match the filename of the edited version of the file attachment to the filename of the file attachment and identify the conversation thread corresponding to the file attachment as being associated with the edited version of the file attachment.

* * * * *